United States Patent
Ninomiya et al.

(10) Patent No.: US 9,030,191 B2
(45) Date of Patent: May 12, 2015

(54) SENSOR SUBASSEMBLY FOR A VEHICLE AND DEVICE FOR MEASURING ROTATIONAL MOVEMENTS OF A WHEEL BEARING

(75) Inventors: Kenichi Ninomiya, Ludwigsburg (DE); Matthias Waibler, Remshalden-Hebsack (DE); Anwar Hegazi, Frienstedt (DE); Andreas Fink, Heilbronn (DE); Mirko Scheer, Besigheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/642,980

(22) PCT Filed: Feb. 28, 2011

(86) PCT No.: PCT/EP2011/052892
§ 371 (c)(1),
(2), (4) Date: Jan. 2, 2013

(87) PCT Pub. No.: WO2011/134698
PCT Pub. Date: Nov. 3, 2011

(65) Prior Publication Data
US 2013/0202235 A1    Aug. 8, 2013

(30) Foreign Application Priority Data
Apr. 27, 2010   (DE) .......................... 10 2010 028 232

(51) Int. Cl.
*G01P 3/48* (2006.01)
*G01P 3/54* (2006.01)
(Continued)

(52) U.S. Cl.
CPC ............... *F16J 15/32* (2013.01); *F16C 33/723* (2013.01); *F16C 41/007* (2013.01);
(Continued)

(58) Field of Classification Search
CPC .......... G01P 1/026; G01P 13/045; G01P 1/02
USPC .......................................................... 324/173
See application file for complete search history.

(56) References Cited

U.S. PATENT DOCUMENTS 3,693,985 A * 9/1972 Dillner ........................ 277/381
5,172,984 A * 12/1992 Lederman ................... 384/489
(Continued)

FOREIGN PATENT DOCUMENTS

DE          42 13 979 A1   11/1993
DE    20 2005 005 260 U1    7/2005
(Continued)

OTHER PUBLICATIONS

English Translation of Japanese Patent # 2009133812.*
(Continued)

*Primary Examiner* — Jermele M Hollington
*Assistant Examiner* — Christopher McAndrew
(74) *Attorney, Agent, or Firm* — Maginot, Moore & Beck LLP (57) ABSTRACT

A sensor subassembly for a vehicle has at least one sensor unit arranged in a cap-shaped plastic part. The cap-shaped plastic part is carried by a retaining bush and seals off the retaining bush at one end. An associated device is configured to measure rotational movement of a wheel bearing. A resilient sealing and compensating element in pressed in between the-shaped plastic part and the retaining bush, in a first sealing area for sealing off a first leakage path, so that the cap-like plastic part, in conjunction with the sealing and compensating element, seals off the retaining bush tightly at one end.

10 Claims, 5 Drawing Sheets

(51) Int. Cl.

| | | |
|---|---|---|
| *G01P 3/42* | (2006.01) | |
| *G01P 15/00* | (2006.01) | |
| *F16J 15/32* | (2006.01) | |
| *F16C 33/72* | (2006.01) | |
| *F16C 41/00* | (2006.01) | |
| *G01D 11/24* | (2006.01) | |
| *G01P 1/02* | (2006.01) | |
| *G01P 3/44* | (2006.01) | |

(52) U.S. Cl.
CPC .......... *F16J 15/3252* (2013.01); *F16J 15/326* (2013.01); *F16J 15/3276* (2013.01); *G01D 11/245* (2013.01); *G01P 1/026* (2013.01); *G01P 3/443* (2013.01); *F16C 33/72* (2013.01); *F16C 2326/02* (2013.01)

(56) References Cited

U.S. PATENT DOCUMENTS

| | | | | |
|---|---|---|---|---|
| 5,195,807 | A * | 3/1993 | Lederman | 301/108.1 |
| 5,296,805 | A * | 3/1994 | Clark et al. | 324/174 |
| 5,629,618 | A * | 5/1997 | Babin et al. | 324/173 |
| 5,814,984 | A * | 9/1998 | Ohmi et al. | 324/173 |
| 5,998,894 | A * | 12/1999 | Raad | 310/68 B |
| 6,037,766 | A * | 3/2000 | Goossens et al. | 324/173 |
| 6,127,819 | A * | 10/2000 | Ouchi | 324/173 |
| 6,218,827 | B1 * | 4/2001 | Ohmi et al. | 324/174 |
| 6,368,719 | B1 * | 4/2002 | Siever et al. | 428/457 |
| 6,570,375 | B2 * | 5/2003 | Stroeters et al. | 324/173 |
| 7,445,388 | B2 * | 11/2008 | Shigeoka et al. | 384/448 |
| 2010/0162831 | A1 * | 7/2010 | Kubokawa et al. | 73/862.381 |
| 2010/0301847 | A1 * | 12/2010 | Nakajima | 324/207.25 |

FOREIGN PATENT DOCUMENTS

| | | |
|---|---|---|
| DE | 10 2005 015 261 A1 | 10/2006 |
| JP | 2006-283976 A | 10/2006 |
| JP | 2009-133812 A | 6/2009 |
| JP | 2009133812 A * | 6/2009 |
| JP | 2010-47254 A | 3/2010 |

OTHER PUBLICATIONS

International Search Report corresponding to PCT Application No. PCT/EP2011/052892, mailed Jun. 1, 2011 (German and English language document) (7 pages).

* cited by examiner

SENSOR SUBASSEMBLY FOR A VEHICLE AND DEVICE FOR MEASURING ROTATIONAL MOVEMENTS OF A WHEEL BEARING

This application is a 35 U.S.C. §371 National Stage Application of PCT/EP2011/052892, filed on Feb. 28, 2011, which claims the benefit of priority to Serial No. DE 10 2010 028 232.4, filed on Apr. 27, 2010 in Germany, the disclosures of which are incorporated herein by reference in their entirety.

BACKGROUND

The disclosure concerns a sensor subassembly for a vehicle, and a device for measuring rotational movements of a wheel bearing for a vehicle.

In the prior art, rotation speed sensors with integral bearing cap are used to measure the wheel rotation speed and seal the wheel bearing media-tight, at present as a metal cap or a plastic cap with integral metal ring and sensor unit. The bearing interface and bearing are sealed in metal caps by force fit, i.e. by a press seat, in conjunction with an organic coating which compensates for micro-leakage paths in the press joint. The coating is usually applied by cathodic dip coating (CDC).

Plastic caps are currently structured so that a sealing element applied externally and compressed axially, such as for example an O-ring seal or a spray-molded seal of silicon or similar, seals the wheel bearing media-tight and at the same time by its elasticity compensates for the different thermal expansion coefficients of the various materials, in particular when plastics and metals are used.

Publication DE 10 2005 015 261 A1 and patent specifications U.S. Pat. No. 6,218,827 B1 and U.S. Pat. No. 5,814,984 each describe a device for measuring rotational movements of a wheel bearing, in particular the wheel bearing of a motor vehicle. The device described comprises a signal emitter arranged on a rotating part of the wheel bearing and a stationary sensor subassembly with a retaining ring and a cap-shaped plastic part as a cover for the wheel bearing. The sensor subassembly is here fixed and the wheel bearing sealed such that the cap-shaped plastic part and the retaining ring are compressed with introduction of a seal onto the stationary part of the wheel bearing.

For sensor assemblies with plastic caps, according to the prior art described above it must be ensured that in the case of axial compression, the compensating and sealing element must seal two leakage paths simultaneously. These are a first leakage path along the integral retaining ring into the plastic cap and hence on an indirect route into the wheel bearing, and a second leakage path along the integral retaining ring directly into the bearing. Here because of the axial compression, for different bearing lead-in chamfers, the sealing concept must be designed afresh each time in order to guarantee the seal by standardized compression of the sealing element, which constitutes a disadvantage of the known solutions. By adapting the sensor encapsulation to the wheel bearing, the abovementioned interface for the compensation and sealing element must likewise furthermore be designed afresh and evaluated or tested for each wheel bearing.

SUMMARY

The sensor subassembly according to the disclosure for a vehicle with the features described below has in comparison the advantage that between a cap-shaped plastic part and a retaining bush, in a first sealing region, to seal a first leakage path, a resilient sealing and compensating element is pressed in such that the cap-shaped plastic part in conjunction with the sealing and compensating element tightly seals the retaining bush at one end. Here the cap-shaped plastic part and the retaining bush form a composite, wherein at least one sensor unit is arranged in the cap-shaped plastic part and the cap-shaped plastic part is carried by the retaining bush.

The device according to the disclosure for measuring rotational movements of a wheel bearing for a vehicle with the features described below in comparison has the advantage that by use of the sensor subassembly according to the disclosure, the first leakage path between the cap-shaped plastic part and the retaining bush in a first sealing region is sealed by a pressed-in resilient sealing and compensating element such that the cap-shaped plastic part in conjunction with the sealing and compensating element tightly seals the retaining bush at one end. The device according to the disclosure for measuring rotational movements of a wheel bearing for a vehicle comprises at least one signal emitter on a rotating part of the wheel bearing and a stationary sensor subassembly with at least one sensor unit arranged in the cap-shaped plastic part, wherein the cap-shaped plastic part is carried by the retaining bush and covers the wheel bearing.

Embodiments of the present disclosure each comprise at least one sealing and compensating element lying on the inside in the composite of the cap-shaped plastic part and retaining bush, which element by its elasticity compensates for the expansion differences between metal and plastic and also at the same time ensures the sealing function between the retaining bush of metal and the cap-shaped plastic part. Thus advantageously a separation is achieved of the first leakage path between the retaining bush and cap-shaped plastic part and the second leakage path between the retaining bush and the wheel bearing. The seal between the wheel bearing and retaining bush is achieved, in the same way as when a metal cap is used, by means of a press joint. To improve the sealing effect, the retaining bush can have an additional coating at least in the region of a third sealing surface of a second sealing region.

Advantageously embodiments of the present disclosure allow a simple construction of the sensor subassembly, wherein mainly standard components can be used so that production and material costs of the sensor subassembly according to the disclosure or a device for measuring rotational movements of a wheel bearing for a vehicle with such a sensor subassembly can advantageously be reduced. The first sealing region to receive the sealing and compensating element can for example be replicated in the tool on injection molding of the retaining bush and therefore depicted very precisely. The position of the sealing and compensating element in the first sealing region formed for example as a recess is not relevant because of the radial seal and therefore need not be monitored closely during production. The only decisive factors are an adequate compression and a guarantee that the sealing and compensating element is arranged in the first sealing region, which can be ensured by an additional retaining element or a self-retaining design of the sealing and compensating element. Thus the sealing and compensating element can no longer be lost on transport or damaged before mounting in the wheel bearing.

Also in embodiments of the disclosure the contact pressure of the sealing and compensating element is advantageously not set on assembly of the sensor subassembly in the wheel bearing, which can be very imprecise, but can be finely adjusted on actual construction of the sensor subassembly. The optimum compression of the sealing and compensating element is hence independent of the mounting of the sensor subassembly in the wheel bearing. With embodiments of the disclosure, the design of the sealing and compensating element is no longer dependent on a lead-in chamfer of the wheel bearing or the bearing manufacturer, and can advantageously be transferred to various diameters, signal emitters etc. of the wheel bearing independently of the design of the corresponding wheel bearing. This advantageously allows a single design and validation of the sealing and compensating element and its interface, i.e. of the first sealing region.

The measures and refinements described herein allow advantageous improvements of the sensor subassembly described herein for a vehicle and the device described herein for measuring rotational movements of a wheel bearing for a vehicle.

It is particularly advantageous that the sealing and compensating element is inserted in the first sealing region such that the sealing and compensating element is radially compressed between a first sealing surface of the cap-shaped plastic part and a second sealing surface of the retaining bush. By compressing the sealing and compensating element in the radial direction, the influence of the material-related different thermal expansions can be reduced.

In an advantageous embodiment of the sensor subassembly according to the disclosure, the retaining bush comprises a first part, the geometry of which is independent of the respective installation site, and a second part, the geometry of which is adapted to the respective installation site. This means that the retaining bush at one end has a prespecified geometry which is the same for almost all sensor subassemblies irrespective of the embodiment of the corresponding installation site or wheel bearing, wherein the retaining bush at the first part is connected with the cap-shaped plastic part. By the variable geometry of the second part of the retaining bush, the retaining bush and hence the sensor subassembly can be adapted optimally to the press-in surface of the wheel bearing, so that advantageously modularity can be achieved which allows the same design of interfaces for the sealing and compensating element even on different wheel bearing sizes or types. Thus the cost of tooling for sensor encapsulation, i.e. for injection-molding and/or positioning of the sensor unit, and for production of the retaining bush for different wheel bearing types with a variation in diameter, height, sensor position, lead-in chamfer, can advantageously be reduced. The retaining bush can for example be produced as a multi-step deep-drawn part.

In a further advantageous embodiment of the sensor subassembly according to the disclosure, the retaining bush at least in the region of a third sealing surface is coated with a CEF coating which has a thickness in the range of around 20 to 30 μm. As a result the sealing effect can be improved at a second sealing region at which for example the retaining bush with the third sealing surface can be pressed for example into a fourth sealing surface of a stationary part of a wheel bearing.

In a further advantageous embodiment of the sensor subassembly according to the disclosure, the cap-shaped plastic part is injection-molded at least partly onto the first part of the retaining bush to form the first sealing region. Thus in a particularly simple manner it is possible to integrate the sensor unit into the cap-shaped plastic part. To increase the mechanical strength, the cap-shaped plastic part is suitably formed in steps. This also applies to the retaining bush. Preferably polyamide is suitable as a material for production of the cap-shaped plastic part. The retaining bush is preferably made of steel.

In a further advantageous embodiment of the sensor subassembly according to the disclosure, the sealing and compensating element is configured as a self-retaining component or is held by a retaining element in the first sealing region. The retaining element can for example be pressed into the first sealing region as an additional retaining ring or molded on the retaining bush as a protruding edge in order to secure the position of the sealing and compensating element in the first sealing region provided. Alternatively a configuration of the sealing geometry is conceivable in which a self-fixing sealing and compensating element such as for example a lamellar seal, lying inside in the first sealing region, performs the sealing and compensating function described above. The sealing and compensating element can for example be configured as an O-ring seal or D-ring seal of HNBR material. By the configuration as a D-ring seal, advantageously the risk of torsion of the sealing and compensating element can be reduced.

In an advantageous embodiment of the device according to the disclosure, the retaining bush at a second sealing region, to seal the second leakage path, is compressed via the coated third sealing surface with a fourth sealing surface on the stationary part of the wheel bearing. As a metal-to-metal joint is used here, no resilient compensating element is required as there are no substantial temperature behavior differences even with different metals.

Embodiment examples of the disclosure are depicted in the drawings and described in more detail in the description below.

DETAILED DESCRIPTION

In the prior art, rotation speed sensors with integral bearing cap are used to measure the wheel rotation speed and to seal the wheel bearing media-tight, at present in the form of a metal cap or plastic cap with integral metal ring and sensor unit. Plastic caps are currently constructed such that a sealing element applied externally and compressed axially, such as for example an O-ring seal or a spray-molded seal of silicon or similar, seals the wheel bearing media-tight and at the same time by its elasticity compensates for the different thermal expansion coefficients of the various materials, in particular in the case of plastics and metals.

One great advantage of plastic caps lies in a significantly reduced component weight which can be reduced by up to 50% in comparison with metal caps. Practically all plastic caps are constructed in a composite of plastic and metal parts so that metal rings are used for force-fit connections to the wheel bearing, the actual sensor unit however is encapsulated with plastic. A problem with the axial seal is the different temperature behavior between the plastic part and the wheel bearing or metal ring, and the high requirements imposed on the wheel bearing and sensor subassembly in the region of compression of the sealing element in relation to cleanliness and dimensional stability. A further disadvantage of known plastic caps lies in the low modularity of the sensor encapsulation which must be designed and structured afresh depending on size of the wheel bearing and sensor position, or e.g. requires a new molding tool for each wheel bearing diameter.

Figure 1:
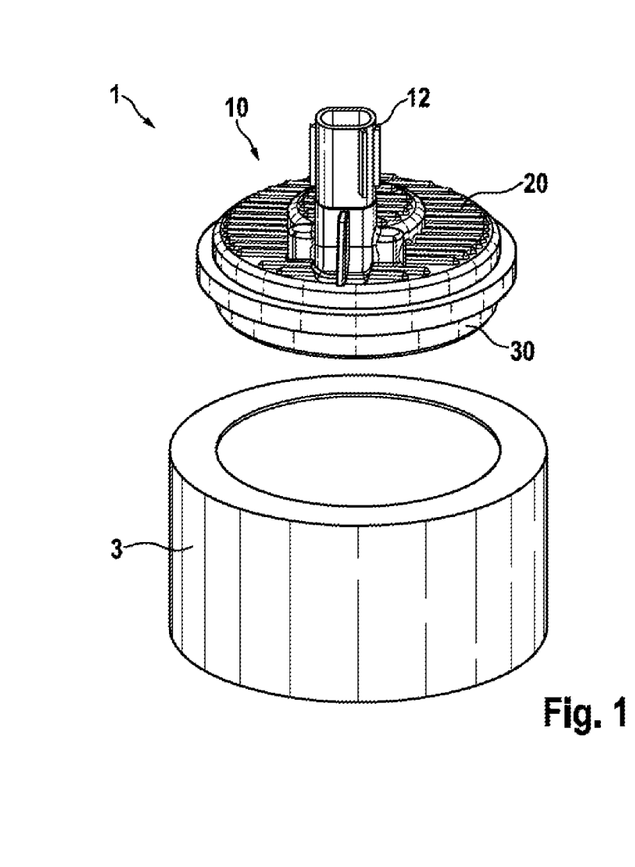
FIG. 1 shows a diagrammatic, perspective depiction of an embodiment example of a device according to the disclosure for measuring rotational movements of a wheel bearing for a vehicle, with a first embodiment example of a sensor subassembly according to the disclosure, before pressing of a retaining bush of the sensor subassembly into a stationary part of the wheel bearing.
Figure 2:
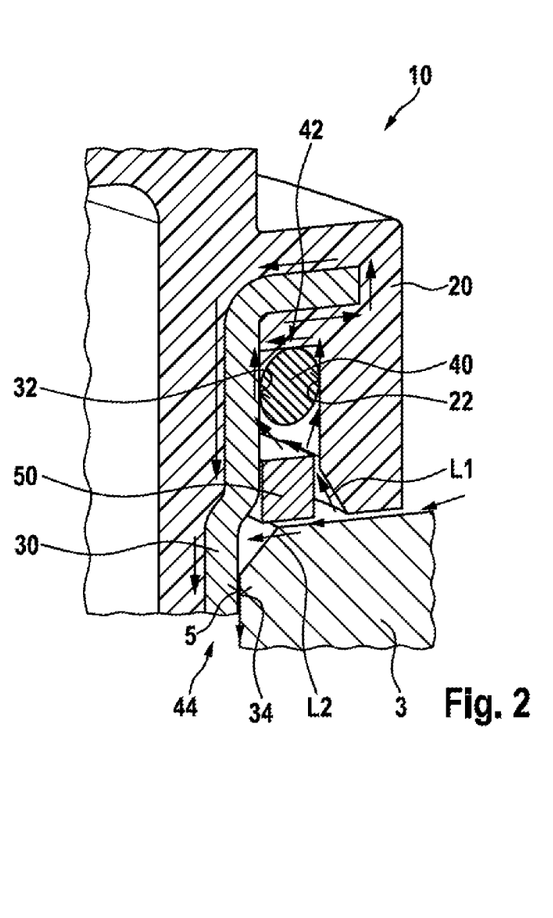
FIG. 2 shows a diagrammatic, perspective, sectional depiction of an extract of the embodiment example of the device according to the disclosure for measuring rotational movements of a wheel bearing for a vehicle from FIG. 1, after pressing of the retaining bush of the sensor subassembly into the stationary part of the wheel bearing.

FIGS. 1 and 2 describe with 3 an annular outer stationary part of a wheel bearing in which a rotating inner part not shown rolls on balls not shown. The structure in principle of a wheel bearing with a device for measuring rotational movements of a wheel bearing for a vehicle is well-known to the person skilled in the art and is described for example in the documents of the prior art cited initially, so that here only the components essential to the disclosure of the device for measuring rotational movements of a wheel bearing for a vehicle are described. A signal emitter arrangement not shown is fixedly connected with the rotating inner part of the wheel bearing and generates signals which are detected by at least one stationary sensor unit, not shown in FIGS. 1 and 2, to evaluate the rotational movement. As is evident from FIGS. 1 and 2, the embodiment example shown of the device 1 according to the disclosure for measuring rotational movements of a wheel bearing for a vehicle comprises a first embodiment example of a sensor subassembly 10 with a cap-shaped plastic part 20 which is carried by a retaining bush 30 and covers the wheel bearing in the mounted state. As is further evident from FIG. 1, a contact element designed as a plug receptacle is molded on the cap-shaped plastic part 20, via which the sensor unit integrated into the cap-shaped plastic part 20 and not shown can be supplied with energy and the signals measured by the sensor unit can be transmitted to a subsequent analysis and/or control unit.

As is further evident from FIGS. 1 and 2, the cap-shaped plastic part 20 is injection-molded at least partly onto an upper part of the retaining bush 30 to form an inner first sealing region 42, wherein a lower part of the retaining bush 30 is designed so that it can be pressed into the stationary part 3 of the wheel bearing. In FIG. 2, L1 designates a first leakage path along the integral retaining bush 30 into the plastic cap 20 and hence on an indirect route into the interior of the stationary part 3 of the wheel bearing, and L2 designates a second leakage path along the integral retaining bush 30 directly into the interior of the stationary part 3 of the wheel bearing.

According to the disclosure, between the cap-shaped plastic part 20 and the retaining bush 30, in the first sealing region 42 to seal the first leakage path L1, a resilient sealing and compensating element 40 is pressed in such that the cap-shaped plastic part 20 in conjunction with the sealing and compensating element 40 tightly seals the retaining bush 30 at the upper end. The sealing and compensating element 40 is inserted in the first sealing region 42 such that the sealing and compensating element 40 is compressed radially between a first sealing surface 22 of the cap-shaped plastic part 20 and a second sealing surface 32 of the retaining bush 30. As is further evident from FIG. 2, the sealing and compensating element 40 is held by a retaining element 50 designed as a retaining ring in the first sealing region 42 designed as a recess, wherein the retaining element 50 is pressed into the first sealing region 42. As is further evident from FIG. 2, the retaining bush 30 at a second sealing region 44, to seal the second leakage path L2, is compressed via a coated third sealing surface 34 with a fourth sealing surface 5 on the stationary part 3 of the wheel bearing. The seal of the interface between the stationary part 3 of the wheel bearing and the retaining bush 30 is achieved by force fit (press seat) in conjunction with an organic coating which is applied by means of CDC and compensates for micro-leakage paths in the press joint. The sealing effect can advantageously be improved by the coating of the retaining bush 30 which is applied at least in the region of the third sealing surface 34.

Figure 3:
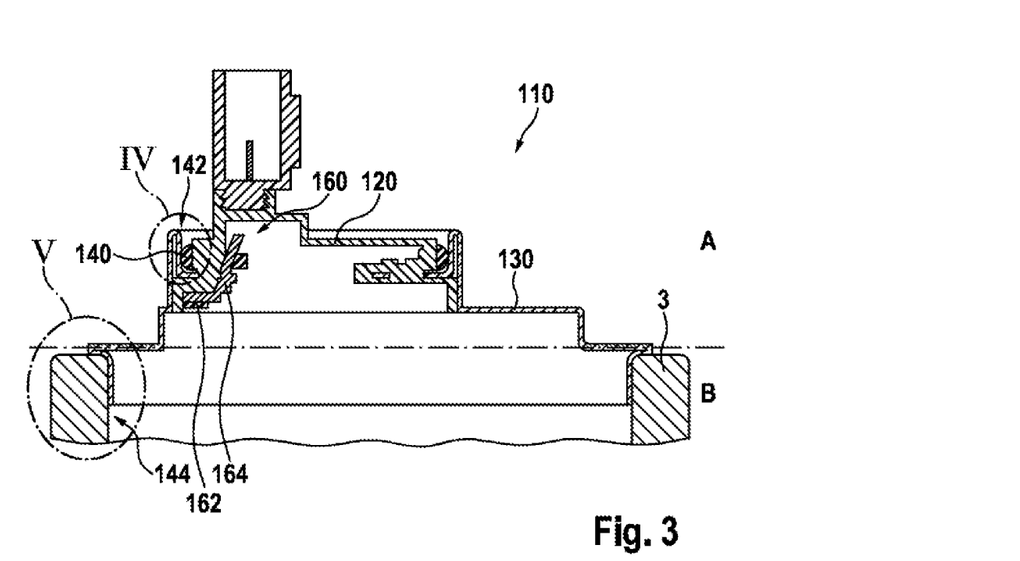
FIG. 3 shows a diagrammatic, perspective, sectional depiction of a further embodiment example of a device according to the disclosure for measuring rotational movements of a wheel bearing for a vehicle, with a second embodiment example of a sensor subassembly according to the disclosure, after pressing of the retaining bush of the sensor subassembly into the stationary part of the wheel bearing.
Figure 4:
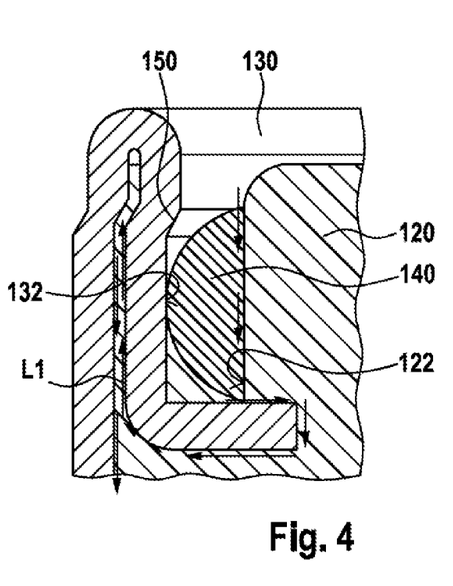
FIG. 4 shows a detailed depiction of a first sealing region of the device according to the disclosure for measuring rotational movements of a wheel bearing for a vehicle from FIG. 3.
Figure 5:
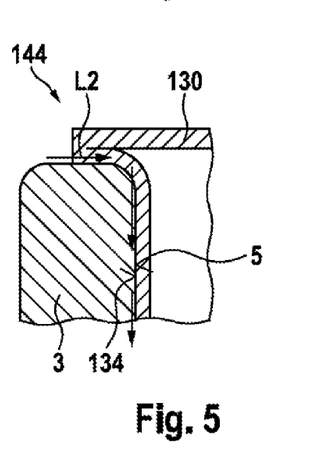
FIG. 5 shows a detailed depiction of a second sealing region of the device according to the disclosure for measuring rotational movements of a wheel bearing for a vehicle from FIG. 3.

FIGS. 3 and 5, similarly to the first embodiment example, also designate with 3 the annular outer stationary part of a wheel bearing in which a rotating inner part not shown rolls on balls not shown. A signal emitter arrangement not shown is firmly connected with the rotating inner part of the wheel bearing and generates signals which are detected by a stationary sensor unit 160 to evaluate the rotational movement.

As is further evident from FIG. 3, the second embodiment example shown of a sensor subassembly 110 for a device for measuring rotational movements of a wheel bearing for a vehicle, similarly to the first embodiment example, comprises a cap-shaped plastic part 120 which is carried by a retaining bush 130 and covers the wheel bearing in the mounted state. Similarly to the first embodiment example, on the cap-shaped plastic part 120 is molded a contact element 112 designed as a plug receptacle. As is further evident from FIG. 3, a sensor unit 160 integrated in the cap-shaped plastic part 120 in the embodiment example shown comprises a sensor element 162 and a bracket 164 for the sensor element 162. The sensor element 162 of the sensor unit 160 is supplied with energy via the contact element 112. Also via the contact element 112, signals for analysis of the rotational movement detected by the sensor element 162 are transmitted to a subsequent analysis and/or control unit, wherein the signals are generated by the signal emitter arrangement not shown which is firmly connected with the rotating inner part of the wheel bearing.

As is further evident from FIGS. 3 and 4, the cap-shaped plastic part 120 is injection-molded at least partly onto an upper part A of the retaining bush 130 to form an inner first sealing region 142, wherein a lower part B of the retaining bush 130 is pressed into the stationary part 3 of the wheel bearing. In FIG. 4, L1 designates a first leakage path along the integral retaining bush 130 into the plastic cap 120 and hence on an indirect route into the interior of the stationary part 3 of the wheel bearing. In FIG. 5, L2 designates a second leakage path along the integral retaining bush 130 directly into the interior of the stationary part 3 of the wheel bearing.

According to the disclosure, between the cap-shaped plastic part 120 and the retaining bush 130 in the first sealing region 142, to seal the first leakage path L1, a resilient sealing and compensating element 140 is pressed in such that the cap-shaped plastic part 120 in conjunction with the sealing and compensating element 140 tightly seals the retaining bush 130 at the upper end. The sealing and compensating element 140 is inserted in the first sealing region 142 such that the sealing and compensating element 140 is compressed radially between a first sealing surface 122 of the cap-shaped plastic part 120 and a second sealing surface 132 of the retaining bush 130. As is further evident from FIG. 4, the sealing and compensating element 140 is held by a retaining element 150 in the first sealing region 142 designed as a recess, wherein the retaining element 150 is designed as an edge molded on the retaining bush 130 which causes a taper of the first sealing region 142.

In the second embodiment example shown, the retaining bush 130 is formed in a multistep manner, here in three steps, as a deep-drawn part, wherein the cap-shaped plastic part 120 is injection-molded onto a first step of the retaining bush 130 such that the plastic cap 120 is fully surrounded on the outside by the retaining bush 130 and the first sealing region 142 is also arranged inside the retaining bush 130 between a folded end of the retaining bush 130 and the cap-shaped plastic part 120. As is further evident from FIGS. 3 and 5, the retaining bush 130 at a second sealing region 144, to seal the second leakage path L2, is compressed via a coated third sealing surface 134 with a fourth sealing surface 5 on the stationary part 3 of the wheel bearing, wherein the third sealing surface 134 at the upper end is limited by a flange-like protrusion of the third step. The seal of the interface between the stationary part 3 of the wheel bearing and the retaining bush 130 is likewise achieved by force fit (press seat) in conjunction with an organic coating which is applied by means of CDC and compensates for micro-leakage paths in the press joint. The sealing effect can advantageously be improved by the coating of the retaining bush 130 at least in the region of the third sealing surface 134. The second sealing region 144 is arranged at a third step, at the end open at the bottom of the retaining bush 130, so that the two leakage paths L1, L2 are physically separated from each other.

In the second embodiment shown, the retaining bush 130 above the press-in surface or the third sealing surface 134 has a prespecified geometry which is independent of the respective installation site, i.e. of the design of the wheel bearing. In the region of the press-in surface or third sealing surface 134, the retaining bush 130 can be adapted to the respective installation site i.e. to the design of the wheel bearing. This means that the retaining bush 130 at one end has a non-variable geometry, wherein the retaining bush 130 at this end is connected with the cap-shaped plastic part 120. Due to the variable geometry of the lower part of the retaining bush 130, the retaining bush 130 can be adapted optimally to the press-in surface or the fourth sealing surface 5 of the wheel bearing so that advantageously modularity can be achieved which allows the same design of interfaces for the sealing and compensating element 140 even with different wheel bearing sizes or types. As a result the cost of tooling for sensor encapsulation, i.e. for injection-molding and/or positioning of the sensor unit 160, and for production of the retaining bush 130 with different wheel bearing types with a variation of diameter, height, sensor position, lead-in chamfer, can be advantageously reduced.

Figure 6:
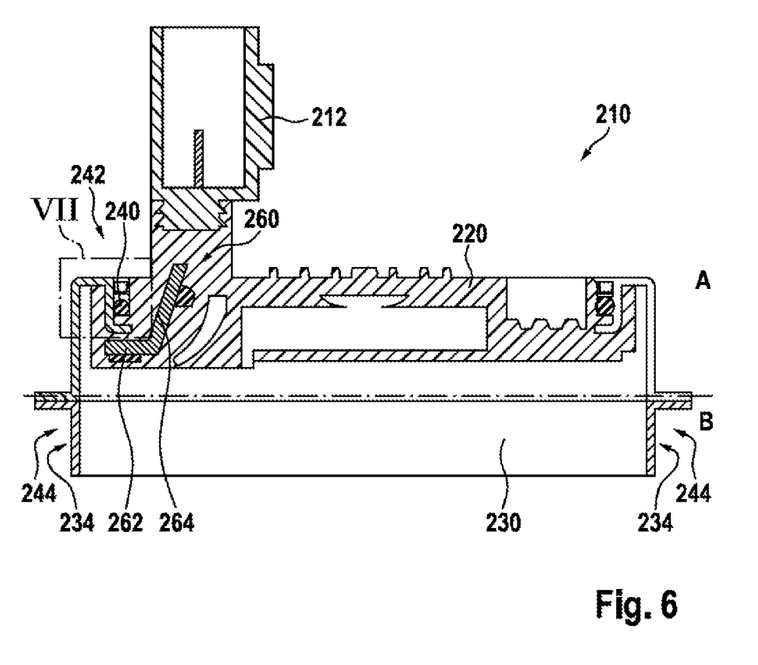
FIG. 6 shows a diagrammatic, perspective, sectional depiction of a third embodiment example of a sensor subassembly according to the disclosure for a vehicle.

As evident from FIG. 6, the third embodiment example shown of a sensor subassembly 210 for a device for measuring rotational movements of a wheel bearing for a vehicle comprises a cap-shaped plastic part 220 which is carried by a retaining bush 230 and covers the wheel bearing not shown here in the mounted state. Similarly to the first and second embodiment examples, on the cap-shaped plastic part 120 is molded a contact element 212 designed as a plug receptacle. As is further evident from FIG. 6, a sensor unit 260 integrated in the cap-shaped plastic part 220, as in the second embodiment example, comprises a sensor element 262 and a bracket 264 for the sensor element 262. The sensor element 262 of the sensor unit 260 is supplied with energy via the contact element 212. Also via the contact element 212, signals for analysis of rotational movement detected by the sensor element 262 are transmitted to a subsequent analysis and/or control unit, wherein the signals are generated by the signal emitter arrangement not shown which is firmly connected with the rotating inner part of the wheel bearing.

Figure 7:
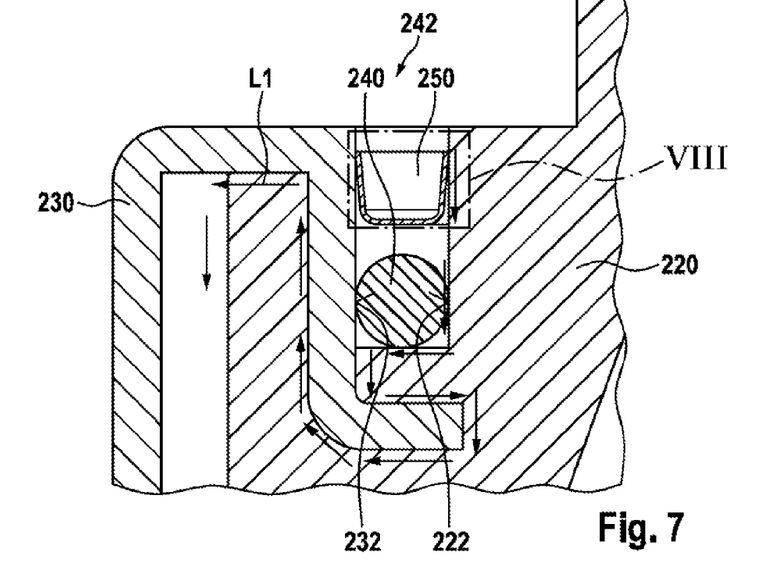
FIG. 7 shows a detailed depiction of a first sealing region of the sensor subassembly according to the disclosure from FIG. 6.

As is further evident from FIGS. 6 and 7, the cap-shaped plastic part 220 is injection-molded at least partly onto an upper part of the retaining bush 230 to form an inner first sealing region 242, wherein a lower part of the retaining bush 230 can be pressed into the stationary part 3 of the wheel bearing. In FIG. 7, L1 designates the first leakage path along the integral retaining bush 230 into the plastic cap 220 and hence on an indirect route into the interior of the stationary part 3 of the wheel bearing. Similarly to the second embodiment example, the second leakage path runs along the integral retaining bush 230 directly into the interior of the stationary part 3 of the wheel bearing.

Figure 8:
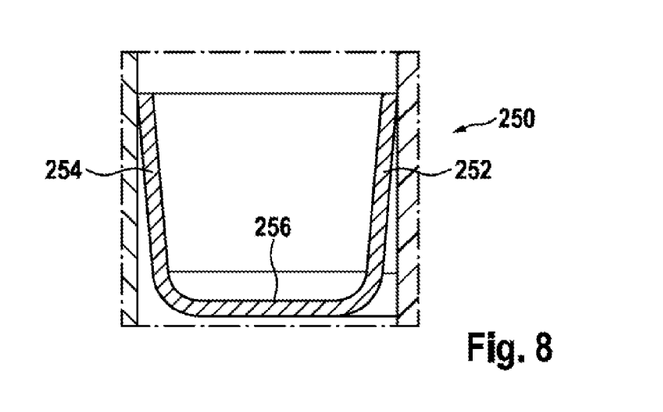
FIG. 8 shows a detailed depiction of a retaining element for the sensor subassembly according to the disclosure from FIG. 6.

According to the disclosure, between the cap-shaped plastic part 220 and the retaining bush 230 in the first sealing region 242, to seal the first leakage path L1, a resilient sealing and compensating element 240 is pressed such that the cap-shaped plastic part 220 in conjunction with the sealing and compensating element 240 tightly seals the retaining bush 230 at the upper end. The sealing and compensating element 240 is inserted in the first sealing region 242 such that the sealing and compensating element 240 is compressed radially between a first sealing surface 222 of the cap-shaped plastic part 220 and a second sealing surface 232 of the retaining bush 230. As is further evident from FIG. 7, the sealing and compensating element 240 is held by a retaining element 250 designed as a retaining ring in the first sealing region 242 designed as a recess, wherein the retaining element 250 is pressed into the first sealing region 242. As evident from FIG. 8, the retaining element 250 is designed as a U-shaped profile open at the top, wherein the side walls 252, 254 are designed such that the U-shaped profile expands starting from the base 256 in order to guarantee an optimum seat of the retaining element 250 in the first sealing region 242.

Similarly to the second embodiment example, the retaining bush 230 in the third embodiment example too is formed in a multistep manner, here in two steps, as a deep-drawn part, wherein the cap-shaped plastic part 220 is injection-molded onto a first step of the retaining bush 230 such that the plastic cap 220 is fully surrounded on the outside by the retaining bush 230 and the first sealing region 242 is also arranged inside the retaining bush 230 between a folded end of the retaining bush 230 and the cap-shaped plastic part 220. As is further evident from FIGS. 6 and 9, the retaining bush 230 at a second sealing region 244, to seal the second leakage path L2 not shown, can be compressed via a coated third sealing surface 234 with a fourth sealing surface 5 on the stationary part 3 of the wheel bearing, wherein the third sealing surface 234 at the upper end is limited by a flange-like protrusion of a second step. The seal of the interface between the stationary part 3 of the wheel bearing and the retaining bush 230 is achieved, similarly to the second embodiment example, also by force fit (press seat) in conjunction with an organic coating which is applied by means of CDC and compensates for micro-leakage paths in the press joint. The sealing effect can advantageously be improved by the coating of the retaining bush 230 at least in the region of the third sealing surface 234. The second sealing region 244 is arranged at the second step at the end open at the bottom of the retaining bush 230 so that here too the two leakage paths L1, L2 are physically separated from each other.

Figure 9:
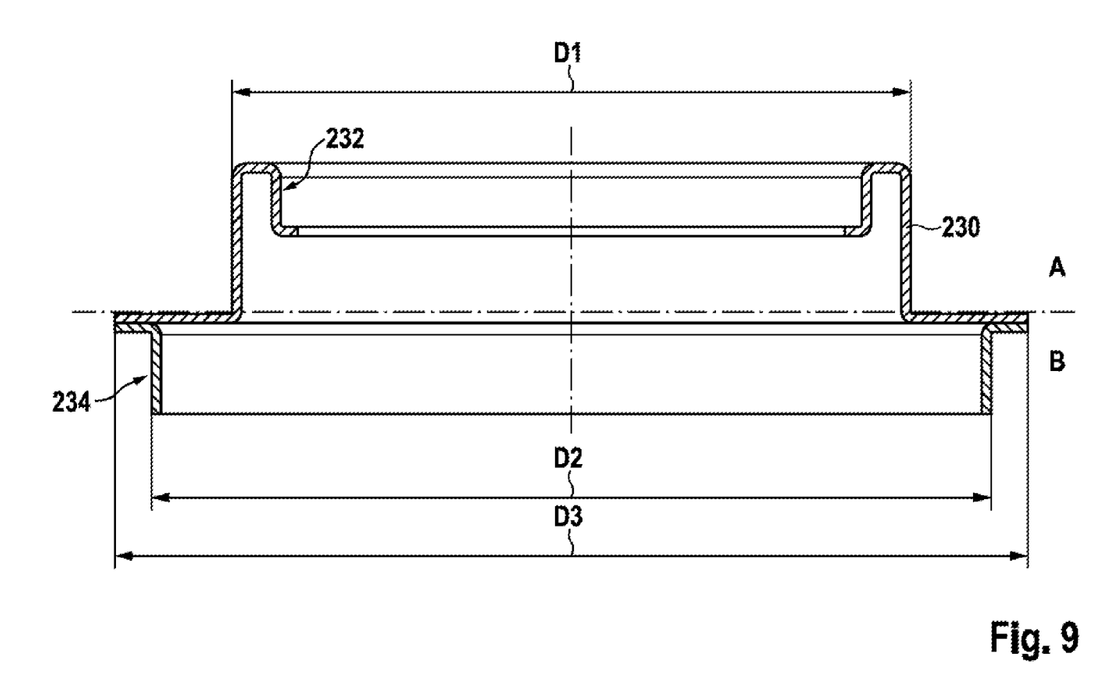
FIG. 9 shows a sectional depiction of a retaining bush for the sensor subassembly according to the disclosure from FIG. 6.

In the third embodiment example shown, the retaining bush 230 above the press-in surface or the third sealing surface 234 has a prespecified geometry which is independent of the respective installation site, i.e. of the design of the wheel bearing. In the region of the press-in surface or third sealing surface 234, the retaining bush 230 can be adapted to the respective installation site i.e. to the design of the wheel bearing. This means that the retaining bush 230 at one end has a non-variable geometry with a constant diameter D1, wherein the retaining bush 230 at this end is connected with the cap-shaped plastic part 220. Due to the variable geometry of the lower part of the retaining bush 230, the retaining bush 230 can be adapted optimally to the press-in surface or fourth sealing surface 5 of the wheel bearing so that advantageously modularity can be achieved which allows the same design of interface for the sealing and compensating element 240 even with different wheel bearing sizes or types. As a result the cost of tooling for sensor encapsulation i.e. for injection-molding and/or positioning of the sensor unit 260, and for production of the retaining bush 230 with different wheel bearing types with a variation of diameter, height, sensor position, lead-in chamfer, can be advantageously reduced. This means that the diameters D2 and D3 of the retaining bush 230 are designed as a function of the corresponding wheel bearing.

Preferably the retaining bush 30, 130, 230 at least in the region of the third sealing surface 3, 134, 234 is coated with a CEF coating which has a thickness in the region of around 20 to 30 μm.

The sealing and compensating element 40, 140, 240 can for example be designed as an O-ring seal or D-ring seal of HNBR material. As an alternative to the embodiments described, the sealing and compensating element 40, 140, 240 can be designed as a self-retaining component for example as a lamellar seal. In this case no retaining element is required.

The present disclosure with the sealing and compensating element lying on the inside in the joint compensates for the expansion differences between metal and plastic and at the same time ensures the sealing function between the metal and plastic parts of the sensor subassembly. Compression takes place in the radial direction which reduces the influence of the different thermal expansions because of the component arrangement.

The invention claimed is:

1. A sensor subassembly configured to be mounted on a stationary part of a bearing for a vehicle, the sensor subassembly comprising:
   a retaining bush configured to be received within the stationary part;
   at least one sensor unit arranged in a cap-shaped plastic part, the cap-shaped plastic part carried by the retaining bush and configured to seal the retaining bush at an end; and
   a resilient sealing and compensating element pressed in between the cap-shaped plastic part and the retaining bush in a first sealing region so as to seal a first leakage path such that the cap-shaped plastic part in conjunction with the sealing and compensating element tightly seals the retaining bush at the end,
   wherein the sealing and compensating element is inserted in the first sealing region such that the sealing and compensating element is compressed only between a first sealing surface of the cap shaped plastic part and a second sealing surface of the retaining bush,
   wherein the retaining bush at a second sealing region is compressed via a third sealing surface with a fourth sealing surface on a stationary part of a wheel bearing to at least partially seal a second leakage path, and
   wherein the sealing and compensating element is arranged only in the first leakage path and is spaced apart from the second leakage path.

2. The sensor subassembly as claimed in claim 1, wherein the sealing and compensating element is inserted in the first sealing region such that the sealing and compensating element is only radially compressed between the first sealing surface of the cap-shaped plastic part and the second sealing surface of the retaining bush.

3. The sensor subassembly as claimed in claim 1, wherein the retaining bush comprises a first part, the geometry of which is independent of a respective installation site, and a second part, the geometry of which is adapted to the respective installation site.

4. The sensor subassembly as claimed in claim 1, wherein the retaining bush at least in a region of the third sealing surface is coated with a cathodic electrodeposition film coating which has a thickness in a range of around 20 to 30 μm.

5. The sensor subassembly as claimed in claim 3, wherein the cap-shaped plastic part is injection-molded at least partly onto the first part of the retaining bush to form the first sealing region.

6. The sensor subassembly as claimed in claim 1, wherein the sensor unit is integrated into the cap-shaped plastic part.

7. The sensor subassembly as claimed in claim 1, wherein the sealing and compensating element is configured as a self-retaining component or is held by a retaining element in the first sealing region.

8. The sensor subassembly as claimed in claim 1, wherein the sealing and compensating element is configured as an O-ring seal or D-ring seal of Hydrogenated Nitrile Butadine Rubber material.

9. A device for measuring rotational movements of a wheel bearing for a vehicle comprising:
   at least one signal emitter arranged on a rotating part of the wheel bearing; and
   one stationary sensor subassembly comprising:
      at least one sensor unit arranged in a cap-shaped plastic part, wherein the cap-shaped plastic part is carried by a retaining bush and covers the wheel bearing; and
      a resilient sealing and compensating element pressed in between the cap-shaped plastic part and the retaining bush in a first sealing region so as to seal a first leakage path such that the cap-shaped plastic part in conjunction with the sealing and compensating element tightly seals the retaining bush at a first end,
      wherein the sealing and compensating element is inserted in the first sealing region such that the sealing and compensating element is compressed only between a first sealing surface of the cap-shaped plastic part and a second sealing surface of the retaining bush,
      wherein the retaining bush at a second sealing region is compressed via a third sealing surface with a fourth sealing surface on a stationary part of the wheel bearing to at least partially seal a second leakage path, and wherein the sealing and compensating element is arranged in the first leakage path and spaced apart from the second leakage path.

10. The device as claimed in claim 9, wherein the sealing and compensating element is inserted in the first sealing region such that the sealing and compensating element is radially compressed between a first sealing surface of the cap-shaped plastic part and a second sealing surface of the retaining bush.

* * * * *